W. T. HOOFNAGLE.
METHOD AND APPARATUS FOR TREATING AIR.
APPLICATION FILED MAY 25, 1915.
1,243,524.
Patented Oct. 16, 1917.
3 SHEETS—SHEET 2.
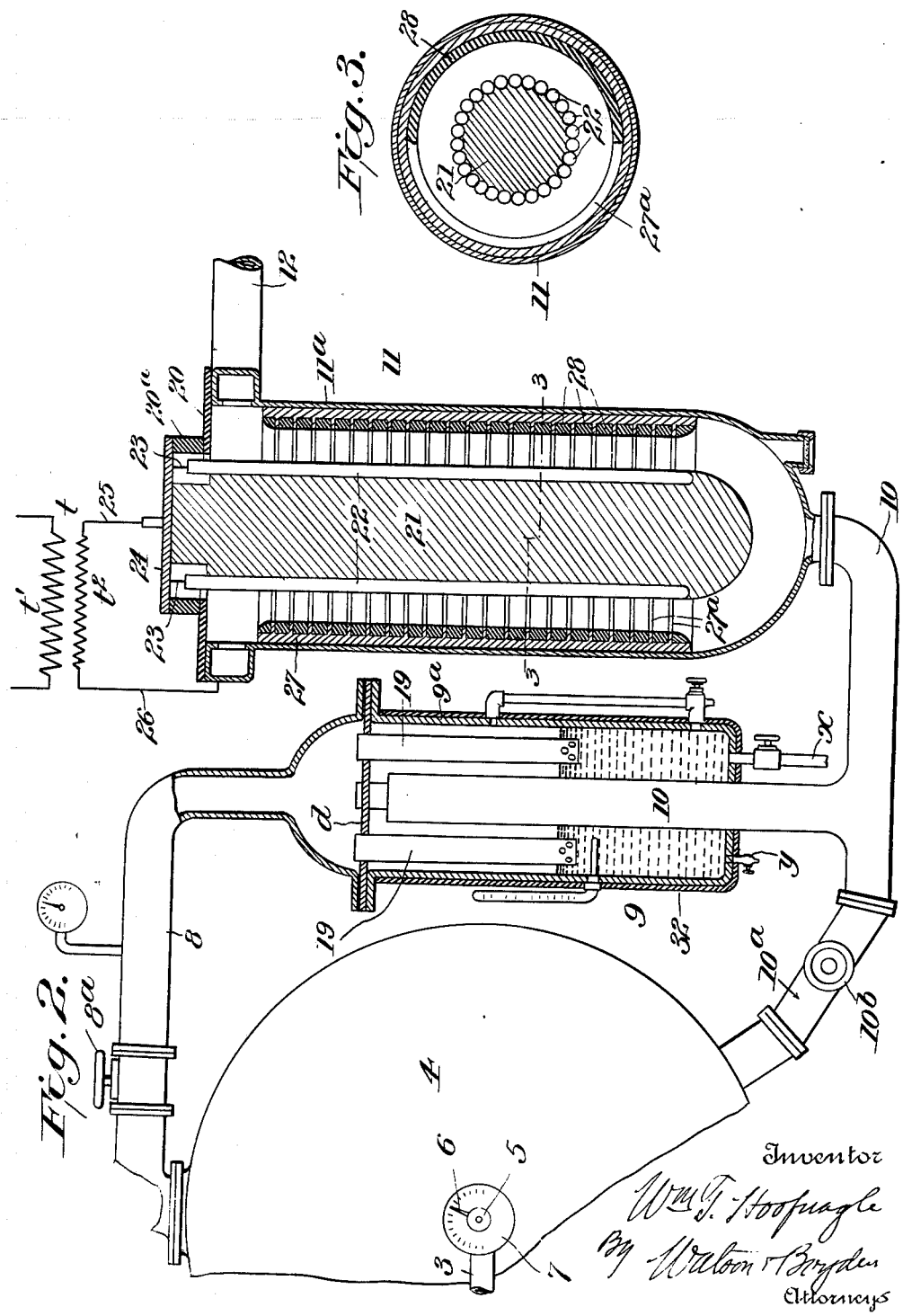

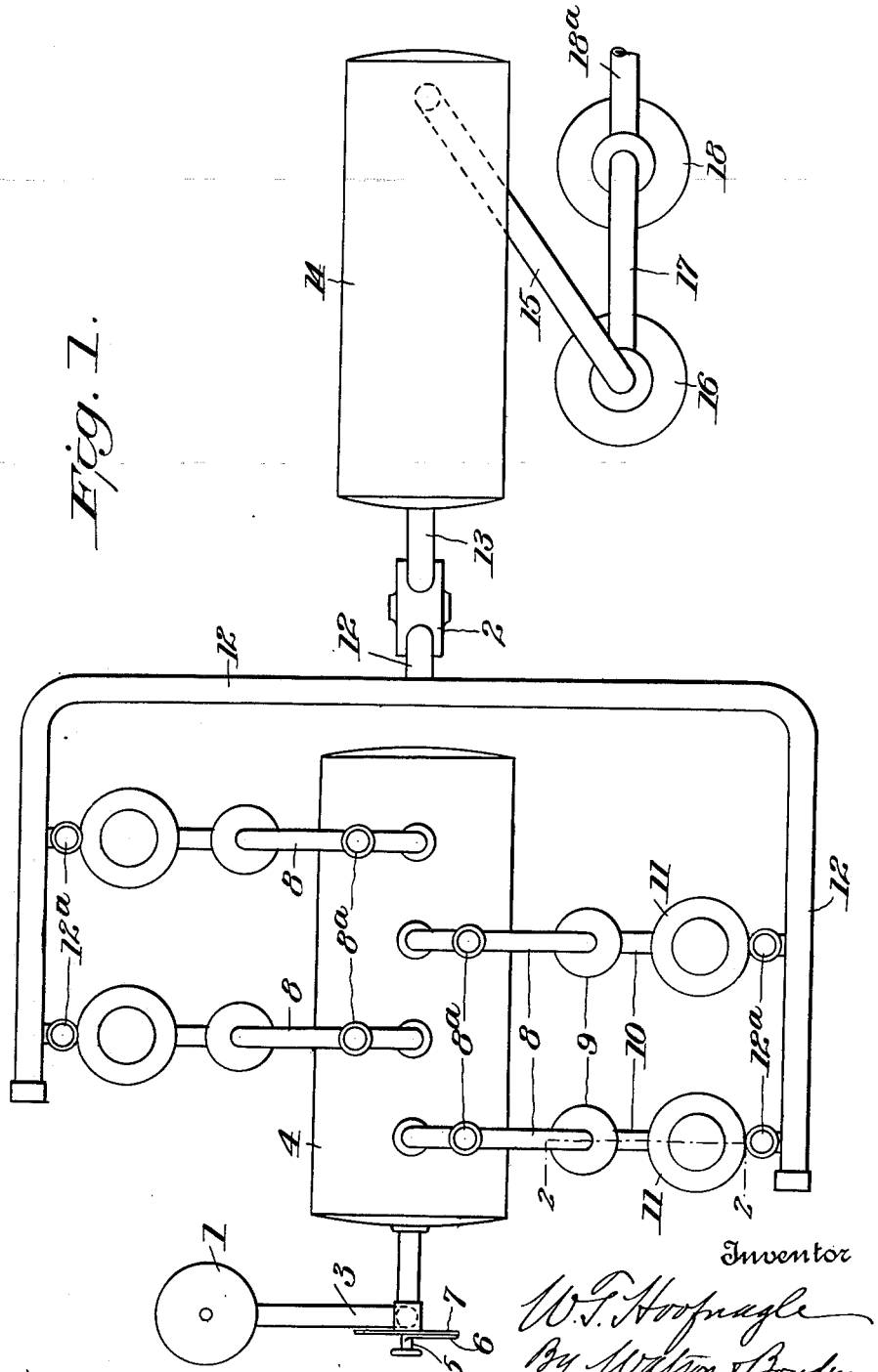

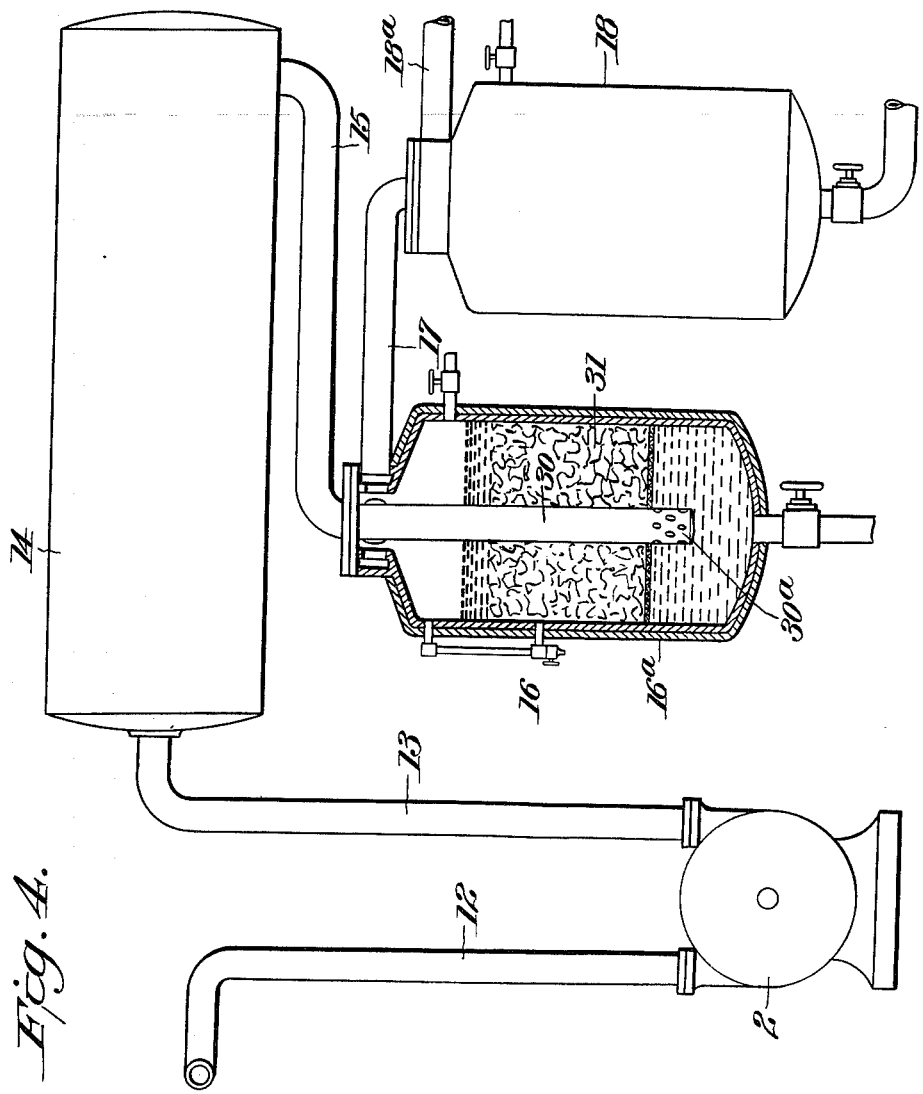

UNITED STATES PATENT OFFICE.

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

METHOD AND APPARATUS FOR TREATING AIR.

1,243,524.   Specification of Letters Patent.   Patented Oct. 16, 1917.

Application filed May 25, 1915. Serial No. 30,338.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Methods and Apparatus for Treating Air, of which the following is a specification.

This invention relates to an improved method of treating air, gases and vapors electrically, and to an apparatus for carrying out the method. The invention is particularly designed for the treatment of air to form nitrogen oxids, which are carried through absorbers to form nitric and nitrous acids, and the invention will be described in its application to this purpose.

In treating air electrically, I have found that a marked increase in the production of nitric and nitrous acid in the absorbers results if water vapor, preferably considerably in excess of the amount which will saturate the air, is added at atmospheric pressure to the air entering the reaction chamber, which effect may be due in part to the fact that the water vapor adds hydrogen and oxygen to the nitrogen oxids sufficient to form nitric and nitrous acids, and also to the fact that the water vapor acts as a catalyzing agent, fixing the unstable oxids. The addition of the water vapor results in another, though minor advantage, to-wit: a saving in the energy necessary to maintain the electrical field in the reaction chamber, the voltage required being lower when the water vapor is added than with dry air.

It is essential to the successful operation of the invention that the water vapor carried into the reaction chamber with the air shall not condense in said chamber. In treating air at atmospheric pressure, wet steam might be added to the air to advantage, but this requires that the reaction chamber be kept hot, in order to prevent condensation of the steam, and this is not desirable. My invention, therefore, contemplates means whereby water vapor, in any desired proportion, may be carried into the reaction chamber with the air, without condensing therein, and without requiring that the reaction chamber be hot.

In carrying out my invention, in order to add a pre-determined amount of water vapor to the air, I preferably first pass the air through a drier to remove the atmospheric moisture. This, though not absolutely essential, is desirable because the moisture in the atmosphere varies, locally, from day to day and from hour to hour, and in order to pass into the reaction chamber air and water vapor in definite, pre-determined portions, it is necessary to start with dry air. For the best results, the air is treated electrically in a rarefied state. By means of a suitable exhaust pump, the air is drawn continuously from the drier through a restricted valve-controlled opening into an expansion tank, thence through a vessel containing water, and thence through the reaction chamber, and the treated air is then compressed up to practically atmospheric pressure and passed successively through an oxidizing tank and one or more absorbers. Owing to the restriction of the inlet opening and the continuous operation of the exhaust pump, the pressure within the expansion tank, water vessel, and reaction chamber is maintained much below the atmospheric pressure. The expansion tank is provided in order that the air, admitted through the restricted opening, may expand to the desired low pressure in the tank, instead of expanding directly into the water chamber or the reaction chamber. Any agitation of the air due to its expansion from atmospheric pressure to the lower pressure takes place, therefore, in the expansion chamber and not in the succeeding vessels through which the air passes and wherein such agitation would be objectionable. The expansion tank forms a reservoir for the low pressure air from which a supply of air may be drawn through one or more sets of water chambers and reaction chambers. From the expansion tank the air passes rapidly through, or over and in close proximity to, a body of water contained in a water chamber. It will be understood that at the low pressure prevailing in this water chamber, rapid vaporization of the water occurs; but this vaporization, I have found, is very greatly increased by the flow of air through or in proximity to the water, and the vaporization can be controlled so that the weight of water vapor passing to the reaction chamber with the air, may be more than 50% of the weight of the air. This regulation can be effected in various ways, as by regulating the temperature of the water, the area of the water surface exposed to contact with the air, the amount of air passing over or through the water, or by the proximity of the air draft to the surface of the water, or by the velocity of the air in contact with the water.

From the water chamber, the air and added water vapor pass into and through the electrical field in the reaction chamber, but, as this chamber is nearer to the exhaust pump than the water chamber, the pressure in the reaction chamber will always be slightly lower than the pressure in the water chamber; hence the water vapor created by reduction in pressure in the water chamber cannot condense in the reaction chamber when the pressure is still lower. A difference in temperature is also maintained between the two chambers, which makes condensation in the reaction chamber impossible, the water chamber being provided with a heat insulating jacket which prevents the absorption of heat from the atmosphere, while the shell of the reaction chamber is exposed to the atmosphere from which it may absorb heat, the latter chamber being also warmer by reason of the electric field within it. The temperature in the reaction chamber, however, does not rise to any considerable extent above that of the surrounding atmosphere, as the electric field is produced by a brush discharge resulting from a current of small quantity but of high potential. The oxids and uncombined gases leaving the reaction chamber are compressed by the pump up to substantially atmospheric pressure, and they may then be passed directly into absorbers, but I preferably pass the products from the reaction chambers slowly through an oxidizing tank, where further oxidization takes place, and thence through the absorbers, where nitric and nitrous acids are formed.

In the accompanying drawing, which illustrates my invention,

Figure 1 is a top plan view of a plant for electrically treating air, embodying a plurality of reaction chambers connected to a common exhaust mechanism;

Fig. 2 is a view, looking from left to right in Fig. 1, showing a part of the expansion tank in end view, and one of the water chambers and a reaction chamber in section on the line 2—2 of Fig. 1;

Fig. 3 is a section through the reaction chamber on the line 3—3 of Fig. 2; and, Fig. 4 is a side elevation of the pump, oxidizing tank and absorbers, one of the absorbers being shown in central vertical section.

Referring to Fig. 1 of the drawing, 1 indicates, conventionally, an air drier, which may be of any suitable design and may contain any suitable absorbing medium for removing moisture from the air passing through it. The air is carried continuously through the apparatus, from the drier, by means of an exhaust pump 2. A pipe 3 leads from the drier to a large expansion tank 4, and in said pipe is a valve 5 for restricting the flow of air into the drier so that the air within the apparatus, between the valve 5 and the exhaust pump, is always at a pressure much lower than the atmospheric pressure. A pointer 6, turning with the stem of the valve 5, operates over a dial 7, this dial being graduated to indicate the number of cubic feet of air per hour passing through the apparatus. Pipes 8 lead from the expansion chamber to water chambers 9, and the latter are connected by pipes 10 to reaction chambers 11. The latter chambers are connected by a trunk pipe 12 to the exhaust pump 2, and from the pump a pipe 13 leads to one end of an oxidizing tank 14. A pipe 15 connects the opposite end of the latter tank to an absorber 16, and the latter is shown connected by a pipe 17 to another absorber 18.

The course of the air through the apparatus is from the drier through the restricted opening controlled by valve 5, thence expanding from atmospheric pressure down to a low pressure as it passes into tank 4, thence passing successively through each water chamber and the reaction chamber connected to it, thence through the trunk pipe 12 to the pump where it is compressed to substantially atmospheric pressure, and thence through the oxidizing tank and the absorbers in succession.

Each water chamber and reaction chamber connected in series may be considered a unit, and one or any number of these units may be employed, the other parts of the apparatus being made proportionally small or large, according to the desired capacity of the plant. Each unit is provided with valves 8$^a$ and 12$^a$, in its inlet and outlet pipes, respectively, so that it may be cut off for repairs, or for any other reason, without disturbing the rest of the system.

As shown in Fig. 2, which illustrates one of the units, the water chamber comprises a vessel 9$^a$, adapted to hold water, which may be admitted in desired quantity through a valve controlled inlet pipe $x$. The pipe 8, leading from the expansion chamber 4, enters the top of the vessel 9$^a$. In the upper part of said vessel is a diaphragm $d$, which divides it into two compartments, and a plurality of tubes 19 extend through the diaphragm from the upper compartment down into the water in the lower compartment. From the upper part of the lower comparement, the pipe 10 leads, through the bottom of the vessel, to the bottom of the reaction chamber 11. The tubes 19 are shown in the drawing extended slightly below the water level, and this arrangement is preferred; but the operation is satisfactory if these tubes lead close to the water without extending into it. The water level may be adjusted so as to be above or below the lower open ends of the tubes, as desired, by regulating the flow through the inlet pipe $x$, and allowing water to flow out, when necessary, through the drip cock $y$. As there is a constant evaporation of water, the valve in the inlet pipe will always be left partly open to compensate for this evaporation while the apparatus is in operation. The rarefied air passes from the pipe 8 downwardly through the tubes 19 into, or in proximity to the water, and thence flows upwardly and into the upper end of the pipe 10, and thence to the reaction chamber. As the moisture is removed from the air before it enters the water vessel, it absorbs, in passing through the latter, a certain amount of moisture which will be the same so long as the temperature and pressure within the vessel and the volume of air flowing through it remain the same.

The amount of water vapor carried into the reaction chamber along with the air may be varied, as hereinafter explained; but, ordinarily, with all of the air passing through the water chamber, water vapor considerably in excess of that required to saturate the air at atmospheric pressure, is added to the air current and flows with it through the reaction chamber. Thus, it will be understood, that the low pressure prevailing in the apparatus between the body of water and the exhaust pump would cause rapid evaporation of the water even if no air were allowed to flow, and this vapor would flow through the reaction chamber to the pump. I have also found, as explained in a co-pending application, that by flowing air close to a body of water in a vacuum chamber connected to an exhaust pump, vaporization of the water takes place much more rapidly than it would if the air current were cut off. Therefore, in the present apparatus, owing to the partial vacuum and the flow of air in contact with the water, the vapor added to the air current will be greatly in excess of the amount that would suffice to saturate the air at atmospheric pressure and may be made to exceed fifty per cent. of the weight of the air. In practice, I have found it advantageous to add about fifty per cent. of water vapor to the air passing through the apparatus. The following will serve as illustrations of the manner in which the proportions of water vapor to air may be varied in this apparatus by varying the flow of air: Flow of air in a given time, 10,500 cc.; pressure in water chamber 28.5 mm.; weight of air 13.4 gr.; weight of vapor 2.5 gr.; proportion of vapor 18.6. Flow of air 6,600 cc.; pressure in water chamber 25.5 mm., weight of air 8.51 gr.; weight of vapor 2.2 gr.; proportion of vapor 25.8. Flow of air 2,000 cc.; pressure in water chamber 22 mm.; weight of air 2.58 gr.; weight of vapor 1.5 gr.; proportion of vapor 58.1.

The amount of water vapor added will, of course, vary according to the temperature of the water, the pressure prevailing in the apparatus, the air current and its proximity to the water, and the area of water surface exposed. The form of the vessel will determine the water surface exposed, the temperature of the water body may be regulated by regulating the temperature of the inflowing water, and the pressure may be regulated by varying the speed of the pump. As a convenient way of changing the proportions of air to water vapor, a shunt is formed around each water chamber by a pipe $10^a$, connecting the pipe 10 directly with the expansion tank, and a regulating valve $10^b$ is placed in pipe $10^a$. It will be evident that by properly manipulating the valves $8^a$ and $10^b$, any desired proportion of the air may be shunted past the water chamber, or it may be caused to all pass through said chamber. If the air is entirely shunted past the water chamber, water vapor will still be generated in said chamber, and carried through the pipe 10 into the reaction chamber, but in lesser quantity than when the air flows through the water chamber.

After passing from the water chamber, the air, with added water vapor, flows upwardly through the reaction chamber, and while passing through the latter chamber it is subjected to the action of an electric current derived from a suitable source, such as the transformer $t$. This reaction chamber is more particularly described in my copending application Serial No. 23,341. It comprises a cup-shaped metal casing $11^a$, to the lower end of which the pipe 10 is connected, and a cover 20 of insulating material extends over the top of the casing and supports a cylindrical core 21, of insulating material, centrally of the casing. A series of dielectric tubes 22, preferably of glass, surround the core, and these tubes contain a suitable conducting liquid, such as mercury or acidulated water, the conducting fluids forming the inner electrode of the reaction chamber. The upper ends of the tubes are preferably filled with some insulating substance which will prevent evaporation of the conducting fluid, and also prevent arcing over the tops of the tubes. Conducting wires 23 lead from the conducting liquids in the tubes to a cap plate 24, which rests upon an annular projection $20^a$ on the insulating cover 20. This cap plate is connected by conductor 25 to the secondary coil $t^2$ of the transformer $t$, and a conductor 26 leads from said coil to the casing 11ª. Within the casing is arranged an electrode consisting of a metal tube 27, in electrical contact with the casing, said tube having thin, inwardly projecting annular ribs 27ª, spaced apart lengthwise of the casing, these ribs constituting the points from which the current discharges through the space intervening between the two electrodes. Preferably, insulating rings 28 are arranged between the ribs. With this arrangement of electrodes, the high tension alternating current from the transformer is rectified to a considerable extent, and the current is largely uni-directional. The air passes upwardly through the space between the electrodes, in which there is a constant electric field, which causes a partial combination of the oxygen and nitrogen. From the upper part of the reaction chamber, the treated products pass through the pipe 12 to the pump, where they are compressed up to substantially atmospheric pressure and passed on through pipe 13 to the oxidizing tank 14. This tank, as shown, is long and of large diameter, and the inlet pipe 13 is connected to one end, while the outlet pipe is connected to the other. It will be evident that on account of the large dimensions of the tank, the combined and uncombined gases will flow slowly therethrough, and further oxidation will take place therein. From the oxidizing tank, the products pass to the absorber 16, and thence through as many other absorbers as may be found necessary, a second absorber being indicated at 18. Any suitable absorber may be used. For the purpose of illustration, one of the absorbers 16 is shown in section, and it comprises a suitable casing 16ª, having an internal lining of acid-proof material. A pipe 30 leads from the pipe 15 down into the lower part of the vessel, and has a perforated end 30ª through which the gases may flow outward into the lower part of the vessel. The vessel is partly filled with a suitable liquid absorbent for absorbing the combined oxygen and nitrogen, and contains a baffle of broken stone 31, to cause a diffusion of the gases throughout the absorbent liquid as they pass upward through it. In the absorber, most of the oxids are retained, while the balance and the uncombined gases pass outward through pipe 17 to the next absorber, in the series, and so on until all of the oxids have been absorbed, the uncombined gases passing finally to the atmosphere through outlet pipe 18ª, leading from the last absorber.

If the same temperature prevailed in both the water chamber and the reaction chamber, the water vapor resulting from reduction in pressure in the former chamber could not condense in the latter for the reason that the vacuum is somewhat higher in the reaction chamber, being nearer to the pump; but this condensation cannot take place in the reaction chamber for the further reason that a higher temperature is maintained therein by the electric field, and by the exposure of the surface of its casing to the atmosphere, so that heat may be absorbed from the atmosphere, while the temperature in the water chamber may be maintained relatively low by placing a jacket of insulating material 32 on its outer surface.

All of the parts from the reaction chamber or chambers to the last absorber, and including these vessels, should either be made of, or lined with, acid-resisting material.

The water vapor, it is believed, acts as a catalytic agent. For the same purpose, a radio-active substance, such as uranium may, with advantage be put into the water.

The term saturation in the specification and claims refers to the maximum percentage of moisture in the atmosphere under the usual conditions of pressure, and the claims are to be read with this understanding.

What I claim is:

1. In an apparatus for treating air, gases, etc., electrically, a reaction chamber, means for passing a current of the fluid to be treated therethrough, and means for adding water vapor to the current in excess of the amount required to saturate said fluid.

2. In an apparatus for treating air, gases, etc., electrically, a reaction chamber, means for passing a current of the fluid to be treated therethrough, at a pressure less than atmospheric pressure, and means for adding water vapor to the current.

3. In an apparatus for treating air, gases, etc., electrically, a water chamber, a reaction chamber, and means for passing a current of the fluid to be treated through said chambers in succession at a pressure below atmospheric pressure.

4. In an apparatus for treating air, gases, etc., electrically, a reaction chamber, a water chamber, means for passing a current of the fluid to be treated through said chambers in succession, and means for shunting any desired part of the current past the water chamber.

5. In an apparatus for treating air, gases, etc., electrically, a water chamber, a reaction chamber communicating with the water chamber, exhaust mechanism connected to the reaction chamber, and means for restricting the flow of the fluid to be treated into the water chamber.

6. In an apparatus for treating air electrically, an expansion tank, a water chamber and a reaction chamber connected in series, exhaust mechanism connected to the reaction chamber and means for restricting the flow of air into the expansion tank.

7. In an apparatus for treating air electrically, an expansion tank, a plurality of water chambers connected to said tank, reaction chambers connected to the several water chambers, exhaust mechanism connected to the reaction chambers, and means for restricting the flow of air into the expansion tank.

8. In an apparatus for treating air electrically, a drier, an expansion tank, a water chamber and a reaction chamber connected in series, exhaust mechanism connected to the reaction chamber and means for restricting the flow of air into the expansion tank.

9. In an apparatus for treating air, a reaction chamber, an oxidizing chamber, a pump for drawing air through the former chamber and delivering it into the latter chamber, means for restricting the flow of air into the reaction chamber, and an absorber connected to the oxidizing chamber.

10. In an apparatus for treating air, a water chamber, a reaction chamber connected thereto, and an oxidizing chamber, a pump for drawing air through the water chamber and reaction chamber successively and delivering it into the oxidizing chamber, means for restricting the flow of air into the water chamber, and an absorber connected to the oxidizing chamber.

11. The method of treating air, gases, etc., which comprises adding water vapor to a current of the fluid to be treated in excess of the amount required to saturate said fluid, and passing the current through an electric field in a reaction chamber.

12. The method of treating air, which comprises vaporizing water in a partial vacuum and passing a current of rarefied air, mingled with the water vapor through an electric field in a reaction chamber.

13. The method of treating air, which comprises drawing air through a chamber containing water and thence through an electric field in a reaction chamber, and restricting the flow of air into the water chamber so as to cause rarefaction of the air and vaporization of the water.

In testimony whereof I have affixed my signature, in presence of a witness.

WILLIAM T. HOOFNAGLE.

Witness:
MARY W. WALLACE.